United States Patent
Kim et al.

(10) Patent No.: US 10,920,357 B2
(45) Date of Patent: Feb. 16, 2021

(54) WASHING APPARATUS

(71) Applicant: LG ELECTRONICS INC., Seoul (KR)

(72) Inventors: Jayoen Kim, Seoul (KR); Youngwoo Kim, Seoul (KR); Joohyeon Oh, Seoul (KR); Darae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 15/528,938

(22) PCT Filed: Oct. 27, 2015

(86) PCT No.: PCT/KR2015/011352
§ 371 (c)(1),
(2) Date: May 23, 2017

(87) PCT Pub. No.: WO2016/085131
PCT Pub. Date: Jun. 2, 2016

(65) Prior Publication Data
US 2017/0321367 A1    Nov. 9, 2017

(30) Foreign Application Priority Data

Nov. 26, 2014  (KR) .................. 10-2014-0166180

(51) Int. Cl.
*D06F 34/28* (2020.01)
*A47L 15/42* (2006.01)
(Continued)

(52) U.S. Cl.
CPC .......... *D06F 34/28* (2020.02); *A47L 15/4293* (2013.01); *D06F 33/00* (2013.01);
(Continued)

(58) Field of Classification Search
CPC .... D06F 39/005; D06F 33/02; D06F 2216/00; D06F 2214/00; D06F 2210/00;
(Continued)

(56) References Cited

U.S. PATENT DOCUMENTS 10,135,379 B2 *  11/2018  Iwahashi .................. G08B 5/36
2005/0024330 A1 *  2/2005  Astrauskas .......... A47L 15/4293
345/158
(Continued)

FOREIGN PATENT DOCUMENTS

EP            2765488 A2    8/2014
JP        2007-165246 A    6/2007
(Continued)

*Primary Examiner* — David G Cormier
*Assistant Examiner* — Thomas Bucci
(74) *Attorney, Agent, or Firm* — Birch, Stewart, Kolasch & Birch, LLP (57) ABSTRACT

The present invention relates to a washing apparatus and to a washing apparatus having a convenient user interface. More specifically, the present invention relates to a washing apparatus that provides a user interface that is concentrated, simple and intuitive. According to an embodiment of the present invention, a washing apparatus may be provided that is characterized by comprising: an annular rotary knob provided for course selection; a display for selectively displaying a course screen showing information on a course selected from within the radial directions of the rotary knob, and an options screen for changing options for at least one wash water temperature; washing intensity, number of rinses, and spin-dry intensity within the course; a switching input part provided within the radial directions of the rotary knob in order to switch between the course screen and the options screen through a selection by a user; and a single variable input part provided to change the options when in (Continued)

the options screen and to make inputs unrelated to the options when in the course screen.

9 Claims, 8 Drawing Sheets

(51) Int. Cl.
  *D06F 33/00* (2020.01)
  *G06F 3/0481* (2013.01)
  *H01H 19/02* (2006.01)
  *G06F 3/0482* (2013.01)

(52) U.S. Cl.
  CPC ........ *G06F 3/0482* (2013.01); *G06F 3/04817* (2013.01); *H01H 19/02* (2013.01); *D06F 2216/00* (2013.01)

(58) Field of Classification Search
  CPC .. D06F 58/28; A47L 15/4293; A47L 2301/04; A47L 2401/22; H01H 19/025; G06F 3/0482
  USPC ... 68/12.27, 12.23, 12.01, 12.02, 12.12, 3 R; 8/158, 159; 200/11 R, 564
  See application file for complete search history.

(56) References Cited

U.S. PATENT DOCUMENTS

| | | | | |
|---|---|---|---|---|
| 2005/0178167 A1* | 8/2005 | Kim | ........................ | D06F 34/28 68/12.27 |
| 2005/0183471 A1* | 8/2005 | Kang | ...................... | D06F 34/28 68/12.27 |
| 2005/0262882 A1* | 12/2005 | Moon | ...................... | D06F 34/28 68/12.01 |
| 2008/0105001 A1* | 5/2008 | Jeong | ...................... | D06F 33/00 68/12.02 |
| 2008/0127999 A1* | 6/2008 | Joerger | ................... | D06F 58/30 134/18 |
| 2008/0276382 A1* | 11/2008 | Benne | ..................... | D06F 34/28 8/158 |
| 2008/0289940 A1* | 11/2008 | Kim | ........................ | D06F 34/28 200/336 |
| 2009/0095028 A1* | 4/2009 | Hoppe | ..................... | D06F 34/28 68/12.04 |
| 2009/0201124 A1* | 8/2009 | Kim | ........................ | G08B 21/18 340/3.71 |
| 2009/0217712 A1* | 9/2009 | Kim | ........................ | D06F 34/28 68/12.27 |
| 2010/0000023 A1* | 1/2010 | McAllister | ............... | D04F 34/28 8/137 |
| 2010/0005598 A1 | 1/2010 | Jung | | |
| 2011/0308023 A1* | 12/2011 | Park | ........................ | D06F 33/00 8/137 |
| 2012/0023681 A1* | 2/2012 | Park | ........................ | D06F 33/00 8/137 |
| 2012/0036900 A1* | 2/2012 | Hong | ...................... | D06F 39/14 68/139 |
| 2012/0056827 A1* | 3/2012 | Kim | ........................ | D04F 34/32 345/173 |
| 2013/0145894 A1* | 6/2013 | Park | ........................ | G05G 1/10 74/504 |
| 2013/0271950 A1* | 10/2013 | Park | ........................ | F21V 3/049 362/23.07 |
| 2014/0067131 A1 | 3/2014 | Park et al. | | |
| 2015/0299930 A1* | 10/2015 | Yang | ....................... | D06F 34/28 362/23.11 |
| 2015/0315737 A1* | 11/2015 | Yang | ................... | F21V 33/0044 362/23.04 |
| 2015/0345068 A1* | 12/2015 | Coffman | ............... | G06F 3/0482 715/771 |

FOREIGN PATENT DOCUMENTS

| | | |
|---|---|---|
| KR | 10-2006-0063000 A | 6/2006 |
| KR | 10-2006-0117425 A | 11/2006 |
| KR | 10-2014-0005484 A | 1/2014 |
| KR | 10-1386818 B1 | 4/2014 |
| WO | WO 2011/128293 A1 | 10/2011 |
| WO | WO 2013/087537 A1 | 6/2013 |

* cited by examiner

FIG. 1

*- Prior Art -*

WASHING APPARATUS

CROSS REFERENCE TO RELATED APPLICATIONS

This application is the National Phase of PCT International Application No. PCT/KR2015/011352, filed on Oct. 27, 2015, which claims priority under 35 U.S.C. 119(a) to Patent Application No. 10-2014-0166180, filed in Republic of Korea on Nov. 26, 2014, all of which are hereby expressly incorporated by reference into the present application.

FIELD

The present disclosure relates to a washing apparatus, and to a washing apparatus having a convenient user interface. More specifically, the present invention relates to a washing apparatus that provides a user interface that is concentrated, simple and intuitive.

BACKGROUND

Generally, a washer for washing clothes is a typical example of a washing apparatus. A dryer for drying clothes is one example and a washing and drying machine is another example of the washing apparatus.

Recently has be released a refresher for refreshing clothes by using hot air or steam, not washing by using water and such a refresher is also one example of the washing apparatus.

Hereinafter, embodiments of the present invention are described, focused on the washer as typical example of the washing apparatus. Embodiments are applicable to the other examples of the washing apparatus, only unless excluded or inconsistent with other devices.

Figure 1:
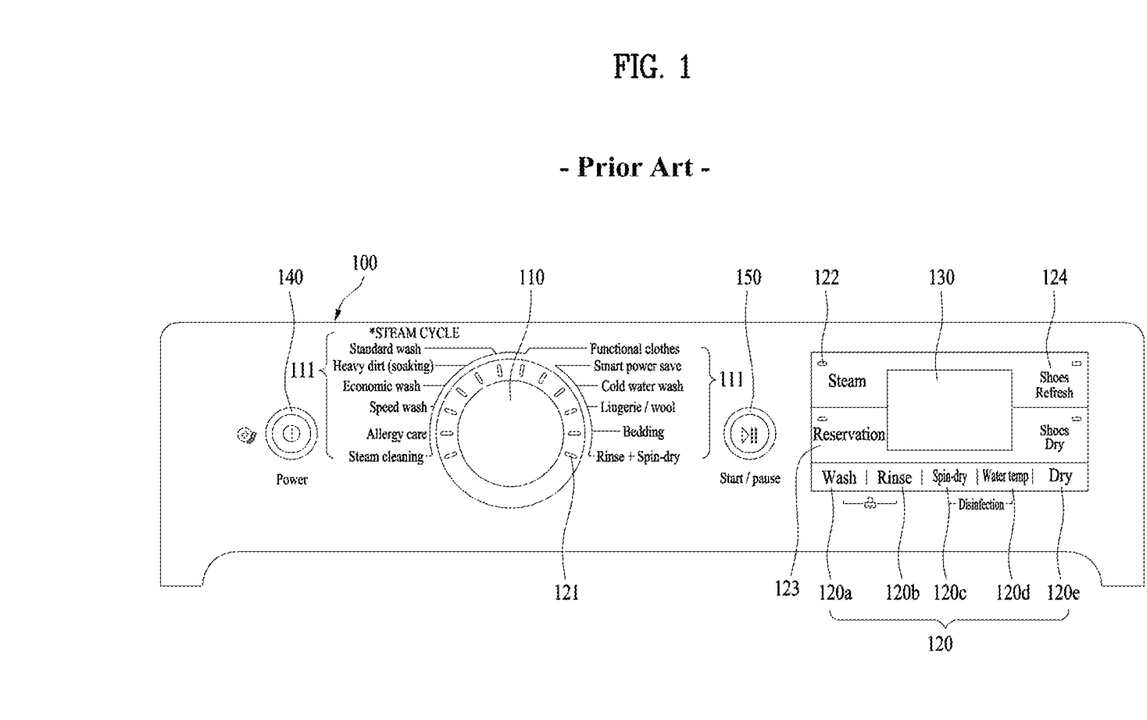
FIG. 1 is a front view illustrating a user interface provided in a conventional washing apparatus.

FIG. 1 illustrates a control panel provided in a conventional washer.

Such a control panel is provided for a user interface and typically provided in a front of the washer to facilitate user accessibility and manipulation. The control panel includes select and input units for a user's manipulation such as diverse buttons; and predetermined display unit for providing information to a user. Such diverse input and select and display units may be a user interface.

A main function of the washer is washing so that the washer can have a course select unit 110 or a main function select unit for allowing the user to select diverse wash courses. The user is able to one or more courses, using the course select unit or the main function select unit. As one example, the course elect unit 110 may be a rotary knob and a course display unit 111 for facilitating the user's course selection may be provided in the control panel 110, so that the user can select a desired wash course by manipulating the course select unit 110 corresponding to the course display unit. When manipulating the course select unit 110, the user is able to identify the course selected through the course display unit 111.

FIG. 1 shows the course display unit 111 showing diverse wash courses around the rotary knob 110. The user is able to select one or more corresponding wash courses as rotating the rotary knob 110. A display unit 121 may be further provided to display the selected wash courses and the user may easily recognize the selected wash course. In other words, the user is able to recognize the selected wash course through the course display unit 111 and the LED display unit 121 configured to flicker corresponding to the user selection.

The course display unit 111 may be provided as a display printed on a front surface of the control panel.

An option select unit 120 may be further provided to allow the user to select optional functions which are added or variable when performing the main functions mentioned above. The option select unit 120 may be provided as various types. As one example, FIG. 1 shows the option input unit 120 for selecting options related with wash option 120a, rinse 120b, spin-dry 120c, water temperature 120d, dry 120e, step 122 and reservation 123 options. An option display unit 122 may be further provided to display whether such options are selected and realized as LED.

The control panel may further include a state display unit 130 for displaying a present state of the washer. The state display unit 130 may be configured to display a present operation state of the washer, a present state of the user course or option select and time information.

For example, when the washer performs a rinsing cycle currently, the state display unit 130 may display "the present state is during the rinsing cycle". When the washer is in a state waiting for the user course input, the state display unit 130 may display "please, input a wash course" and the current time or the time (residual time) remaining until the washer completes the wash course.

Meanwhile, the control panel 100 may include a power input unit 140 for supplying or cut off the power; and a start/pause input unit 150 for starting or pausing the operation of the washer.

The control panel 100 and the washer including the same have following disadvantages.

First, the control panel 100 provided in the conventional washer has a narrow internal space and it is difficult to realize additional user interface to the basic configuration in the internal space of the conventional control panel 100.

Second, the select units 110 and 120 and the display units 111, 121 and 122 have preset functions and it is not easy to expand additional functions. In addition, the diverse select units 110 and 120 are exposed to the user as they are. In other words, not only a required select unit but also the other ones which are not needed to be exposed might be exposed. Accordingly, a user unexperienced with using the units is likely not to use diverse functions provided in the washer.

Third, there are many dispersed select units 110 and 120 and display units 111, 121 and 122, so that the user can feel quite uncomfortable in using the user interface. In other words, the user has to fix eyes on each of the units so as to recognize the information input to the washing apparatus.

Recently, home electric appliances tend to hire minimal designs and demand for a simple and intuitive user interface becomes high, not the complex user interface. However, it is not so easy to realize such a simple intuitive user interface in the washing apparatus, because at least all the configurations of the user interface shown in FIG. 1 has to be included while realizing such the simple intuitive user interface. In addition, the user familiar to the conventional user interface has to adapt to a new user interface, with no difficulties.

With such various difficulties and disadvantages, it is not easy to modify and change the conventional user interface.

Meanwhile, the number of the courses basically provided in the washing apparatus shown in FIG. 1 is preset. For example, FIG. 1 shows twelve wash courses. Accordingly, it is difficult to add one or more new wash courses. Even if new courses are added, the user has no choice but to select one or more added courses by using an auxiliary option button, not using the course select unit 110. In other words, when selecting a wash course in the same level course selection, the user has to select the course on an auxiliary select unit (for example, a shoe refresh course unit 124), not the course select unit 110. Accordingly, it is not easy for a user who is not very experienced to use the added wash courses.

DETAILED DESCRIPTION OF THE INVENTION

Technical Problem

To overcome the disadvantages, an object of the present invention is to address the above-noted and other problems.

Another object of the present invention is to provide a washing apparatus which includes a simple and intuitive user interface.

A further object of the present invention is to provide a washing apparatus which is easy for a user to select one or more wash courses and one or more options related with the wash courses and which improves usability by showing the information selected right after the user selects.

A further object of the present invention is to provide a washing apparatus which is capable of realizing a minimal design by concentrating the user interface on a specific location, not dispersing it on a control panel.

A further object of the present invention is to provide a washing apparatus which is reducing the number of input units by providing one variable input unit.

A further object of the present invention is to provide a washing apparatus which is capable of allowing the user to check and identify one or more new wash courses, even if one or more new wash courses are provided.

A further object of the present invention is to provide a washing apparatus which is capable of excluding or minimizing the characters printed on the control panel or various input units.

A further object of the present invention is to provide a washing apparatus which is easy to select a wash course or option on a screen of a display unit.

A further object of the present invention is to provide a washing apparatus which is convenient to use by locating an option select unit in four upper, lower, right and left regions with respect to a rotary knob, the option select unit for selecting wash, rinse, water temperatures and spin-dry options which are used most.

Technical Solution

To achieve these objects and other advantages and in accordance with the purpose of the embodiments, as embodied and broadly described herein, a washing apparatus includes providing a plurality of wash courses; and provided to change one or more options of a specific wash course on assumption that the specific wash course is selected from the wash courses, the washing apparatus comprising: a knob assembly comprising a annular rotary knob and provided for a user to select the specific wash course; a display region comprising a display for selectively displaying a course screen for the specific wash course selected through the rotary knob and an option screen for changing the option; a single variable input unit additionally selected by the user, independent from the rotary knob, and having several input information sources and displaying the several input information sources; a conversion input unit provided to be selected by the user, independent from the rotary knob and converting the input information displayed on the single variable input unit; and a control unit receiving input of the conversion input unit and controlling the single variable input unit to convert the displayed input information.

The control unit determines that the information displayed on the single variable input unit is input, when the single variable input unit is selected. For example, two input information sources may be displayed on one single variable input unit. One of the input information sources may be selectively displayed. At this time, input corresponding to the displayed input information may be made. In other words, when the single variable input unit is selected, it is determined that the displayed input information is input. Also, two input information sources are not displayed all. At this time, the single variable input unit is not activated so as to be determined that no input information is input even when the single variable input unit is selected. Accordingly, the plurality of the inputs may be possible via one single variable input unit and required input may be made in a required condition. Even in the situation which needs no inputs.

The single variable input unit comprises a plurality of light transmission unit corresponding to the plurality of the input information; a plurality of light sources corresponding to the plurality of the light transmission units, respectively; a single touch portion; and a single switch corresponding to the single touch portion.

The light transmission units may be formed in the single touch portion. For example, horizontally arranged or vertically arranged light transmission units may be formed in the single touch unit. One of the light transmission units may be corresponding to one or two light sources.

The control unit selectively controls brightness of the light sources for the user to recognize specific data of the input information displayed on the single variable input unit. In other words, light transmission as specific information input is performed to transmit bright light via the light transmission units and no light or dark light may be transmitted via the light transmission corresponding to the another input information. At this time, the selection of the single variable input unit means the selection of the specific information, so that the user's confusion may be excluded to facilitate the intuitive an easy use.

The control unit controls the bright of the light sources to be at least two levels including the maximum and the minimum or at least three levels including the maximum, the middle and the minimum.

The single variable input units may be provided in the inner portion with respect to the radial direction of the rotary knob, distinguished from each other. The plurality of the single variable input units are distinguished from each other in an inner portion with respect to a radial direction of the rotary knob.

Each input information of the single variable input units may include a course option including wash water temperature, washing intensity, number of rinses and spin-dry intensity set in the specific wash course. The input information of the single variable input units may include the input information irrelevant to the course option. The plurality of the input information sources of the single variable input unit include a course option for selecting wash water temperature, washing intensity, number of rinses and spin-dry intensity variably set in the specific wash course and input information irrelative to the course option.

The input information irrelative to the course option comprises reservation setting, communication setting, menu setting and pause/stop.

For example, one single variable input unit may be provided to select a course option related to the wash and to select reservation which is irrelevant to the course option. When a course screen for selecting the wash course is displayed, the plurality of the single variable input units displays no input information about the course option. At this time, it is preferred that only the input information irrelevant to the course option is displayed. When the wash course is selected and the option screen for changing the course options of the selected wash course is displayed, the input information irrelevant to the course option is not displayed. At this time, only the input information related to the course option is displayed.

At least four single variable input units are provided to correspond to the four course options, respectively.

The conversion input unit comprises a switch operable by the user's press or touch of the display. The switch may be provided behind the display.

In another aspect of the present invention, a washing apparatus comprises a annular knob provided for the user to select a specific one from a plurality of wash course; a display provided to selectively display a course screen for the specific wash course selected through the rotary knob and an option screen for changing options for the specific wash course; a single variable input unit selected by the user, independent from the rotary knob, and selectively displaying a plurality of input information sources; and a conversion input unit provided for the user to select, independent from the rotary knob, and convert the input information displayed on the single variable input units.

The option comprises one or more of the wash water temperature, number of rinses, washing intensity and spin-dry intensity as a basic option in the specific wash course.

The single variable input unit is provided as an option select unit for selecting the basic option.

The basic option input information is converted into the information irrelevant to the basic option input information by the input to the conversion input unit. The input information irrelevant to the basic option input information comprises at least one of start/pause and reservation for delaying the end time point of the specific wash course.

More specifically, when the single variable input unit displays the input information related to the basic option, the single variable input unit may function as an option select unit for selecting the basic option. However, when displaying the input information irrelevant to the basic option, the single variable input unit may function as a select unit to making inputs irrelevant to the basic option.

The option select unit is provided to select the wash water temperature, the number of rinses, the washing intensity and the spin-dry intensity.

The display is located in an inner portion with respect to a radial direction of the rotary knob. More specifically, the option select unit may be located in an inner portion with respect to the radial direction of the rotary knob and an outer portion with respect to a radial direction of the display. The option select unit may be provided in the inner portion with respect to the radial direction of the rotary knob and an outer portion with respect to a radial direction of the display at 12, 3, 6 and 9 o'clock.

In a further aspect of the present invention, a washing apparatus comprises a annular rotary knob provided to select a wash course; a display provided in an inner portion with respect to a radial direction of the rotary knob and selectively displaying a course screen for displaying information about a selected course and an option screen for changing options for at least one of wash water temperature, washing intensity, number of rinses and spin-dry intensity in the course; a conversion input unit provided for conversion between the course screen and the option screen by the user's selection and in an inner portion with respect to the radial direction of the rotary knob; and a single variable input unit provided to change the option on the option screen and make irrelevant input to the option on the course screen.

The plurality of the single variable input units are provided, and the input information displayed by one single variable input unit is different on the course screen from the option screen.

Advantageous Effects

The embodiments have following advantageous effects. The washing apparatus may include a simple and intuitive user interface.

Furthermore, the washing apparatus is easy for a user to select one or more wash courses and one or more options and which improves usability by showing the information selected right after the user selects.

Still further, the washing apparatus is capable of realizing a minimal design by concentrating the user interface on a specific location, not dispersing it on a control panel.

Still further, the washing apparatus may reduce the number of input units by providing one variable input unit.

Still further, the washing apparatus is capable of allowing the user to check and identify one or more new wash courses, even if one or more new wash courses are provided.

Still further, the washing apparatus is capable of excluding or minimizing the characters printed on the control panel or various input units.

Still further, the washing apparatus may include a display provided in an inner portion in a radial direction of the rotary knob and is easy to select a wash course or option on a screen of a display unit by using the rotary knob effectively.

Still further, the washing apparatus is convenient to use by locating an option select unit in four upper, lower, right and left regions with respect to a rotary knob, the option select unit for selecting wash, rinse, water temperatures and spin-dry options which are used most.

DESCRIPTION OF SPECIFIC EMBODIMENTS

Description on a washing apparatus in accordance with exemplary embodiments of the present disclosure will now be given in detail according to exemplary embodiments disclosed herein, with reference to the accompanying drawings. Especially, a user interface provided in the washing apparatus will be described in detail.

Figure 2:
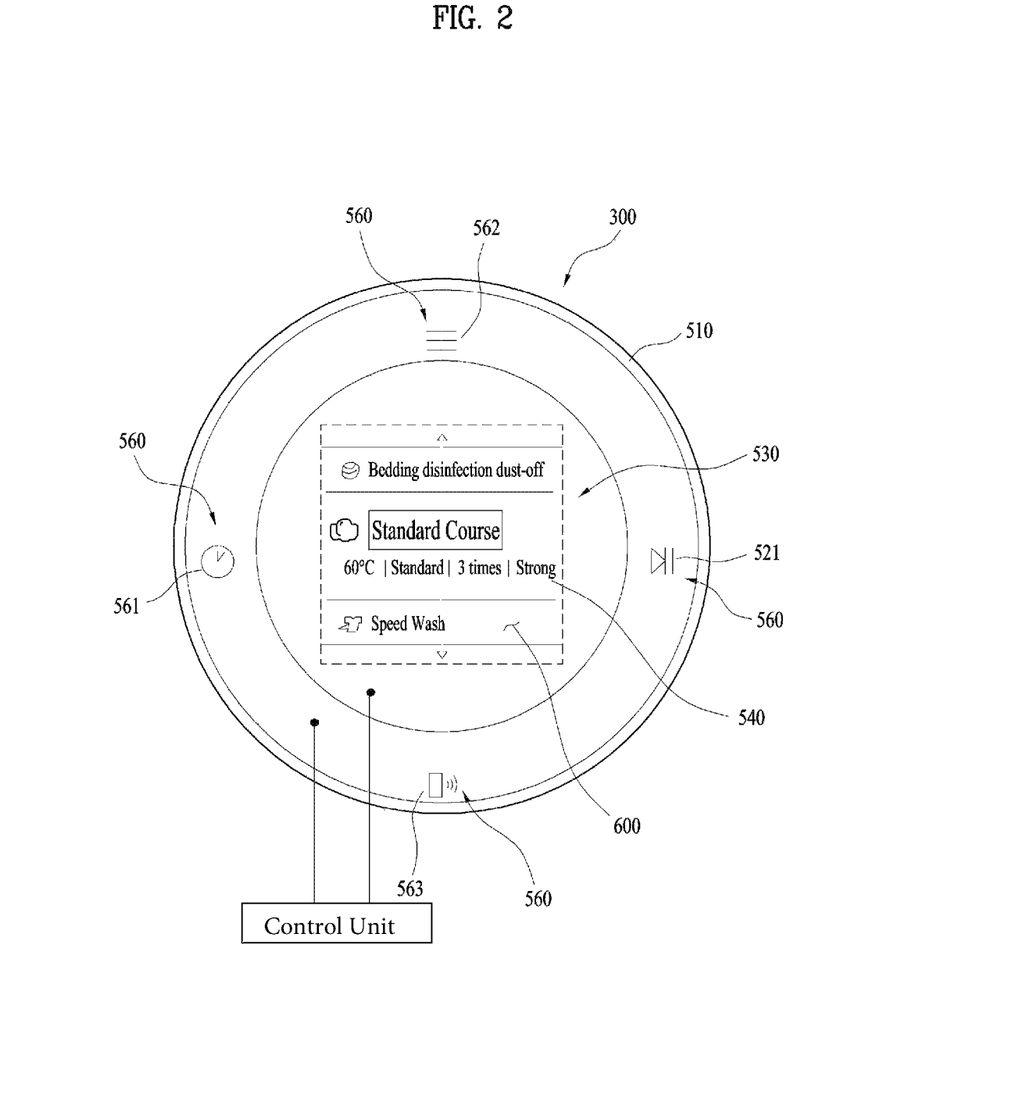
FIG. 2 is a front view illustrating one example of a user interface in accordance with the present disclosure.

FIG. 2 is a front view illustrating one example of a user interface 300 in accordance with the present disclosure. The user interface 300 may be provided in a control panel (200, see FIG. 5) of the washing apparatus or a cabinet which defines an external appearance of the washing apparatus. Of course, the control panel 200 may be a part of the cabinet defining the external appearance of the washing apparatus or mounted to the cabinet.

As shown in the drawing, the washing apparatus may include a user interface 300 in which the conventional complex and diverse input or select units and display unit are concentrated on a region around a rotary knob 510.

In the illustrated embodiment different from the conventional user interface shown in FIG. 1, the example realize the user interface having minimized input units arranged with respect to the rotary knob 510, without diverse input units and displays dispersed therein. In addition, such the user interface is capable of having the functions of the conventional user interface and one or more new functions substantially.

The illustrated example of the washing apparatus may include a display region 530 provided in an inner portion with respect to a radial direction of the rotary knob 510. The display region 530 may include a display 540 and the display 540 may display course information and option information.

The display 540 may be realized as liquid crystal display, for example, LCD, LED or OLED display. Alternatively, the display 540 may be realized as touch display, for example, a display of a smart phone.

However, such a touch display is likely to raise production cost drastically and a control unit (not shown) requiring a high performance processor is also likely to raise the cost. Accordingly, it is preferred that a liquid crystal display capable of displaying simple characters and figures is provided.

More specifically, the display 540 may be configured to selectively display a course screen for a specific wash course selected through the rotary knob. Alternatively, the display 540 may display a guide screen (not shown) or a course preceding screen (not shown) as well as the course screen.

The illustrated example of the washing apparatus may include a single variable input unit 560 (variable input interface) provided between the rotary knob 510 and the display region 530. In other words, the single variable input unit 560 may be provided in an inner portion with respect to a radial direction of the rotary knob 530 and an outer portion with respect to a radiation direction of the display region 530. A plurality of single variable input units 560 may be provided.

It is preferred that the illustrated example of the washing apparatus provides a plurality of wash courses so that the user can select a specific one of the wash courses according to an object of washing or a fabric type of the laundry. FIG. 1 shows twelve wash courses are basically provided. The user is able to figure out the number of the wash courses on the LED display unit 121. Even when the LED display unit 121 is provided, it is not easy to add a new wash course.

Accordingly, the plurality of the wash courses are provided in the illustrated example of the washing apparatus and it is preferred that LED display units 121 corresponding to the wash courses are not provided. In other words, the user is able to select a specific course from the wash courses which are sequentially displayed on the display 540 by the user's manipulation of the rotary knob 510.

The user is able to select one specific one of the wash courses though using the rotary knob 510. When the user holds and rotates the rotary knob 510, the preset courses selected sequentially may be changed. Such the course selection through the rotary knob 510 is similar to the selection shown in FIG. 1. Accordingly, the user experienced in selecting wash course through rotary knob 510 may have least burden or difficulty for a new user interface.

As shown in FIG. 2, a current wash course (for example, a standard course) may be displayed on a central region of the display 540. The earlier and next courses may be displayed on upper and lower regions with respect to the current wash course displayed on the central region. For example, when the rotary knob is rotated 1 pitch in a clockwise direction, a speed wash course as the next course may be selected. When the rotary knob is rotated 1 pitch in a counter-clockwise direction, a bedding dust off disinfect course as the earlier course may be selected.

Once electric power is applied to the washing apparatus, a start-up guide screen may be displayed on the display 540. For example, the start-up guide screen with text message of "please, select wash course".

As the user rotates the rotary knob 510 for course select, the plurality of the wash courses may be sequentially displayed on the display 540. A screen displayed at this time may be a course screen. FIG. 2 shows a course screen displaying information about "Standard Wash Course" as one example.

The course screen diverse information about the selected specific course as well as a course name. For example, as shown in FIG. 2, diverse information about cycles of the course may be displayed. Such information may related to a wash cycle, the wash water temperature in a rinse cycle, a strength level of the wash cycle, the number of rinse cycles and a level of a rinse cycle. A set of such four information sources or options may be referred to as 'a basic option', in other words, a basic option of the wash course.

The user is able to intuitively check the course information selected through the display 540 provided in the rotary knob 510 for selecting the wash course. In other words, the user is able to easily recognize the information on the selected course, without moving or dispersing his or her gaze.

Meanwhile, the languages displayed on the display may be variable in diverse ways. Each of the languages may be changed in a software program. Especially, the course name is set in each language. Even if the currently displayed language is changed, course information may be easily displayed in the correspondingly changed language, without changing hardware program.

The course names are provided as printed characters in a front surface of the control panel shown in FIG. 1. The washing apparatus manufactured by one manufactures may be sold in overseas as well as domestically, so that the hardware programs of the washing apparatus have to be changed in each language disadvantageously. However, the display provided in the inner and outer portions with respect to the radial direction of the rotary knob 510 or arranged around the rotary knob 510 is capable of displaying each different language correspondingly according to the soft program. That means that there is no need for a new control panel corresponding to each language in each country.

Typically, the conventional wash course may include a wash cycle, a rinse cycle and a spin-dry cycle. According to a wash course, at least one cycle may be omitted and the duration time and performance frequency and a drum-drive pattern of each cycle may be preset differently.

Each of the wash courses has a basic setting value. For example, basic setting values for the standard wash course shown in FIG. 2 include the wash water temperature of 60° C., a standard washing intensity, three times of a rinse cycle and a strong spin-dry intensity. Such basic setting values may be set and variable for each wash course. The variation may be limited in one or more specific courses.

After selecting a specific course from the wash courses, the user may select a start/pause input unit 521. That may be the most basic usage of the washing apparatus. Once the start is input, the washing apparatus is operated to start driving according to a selected specific course and perform preset cycles sequentially only to end the course.

As mentioned above, diverse options may be selected in the wash courses, in other words, diverse options for changing preset setting values or conditions may be selected and the selection of such options may be performed on the assumption that a specific wash course is selected.

Such options may include at least one of changing conditions of each cycle provided in the wash course and performing an auxiliary cycle.

In general, the options may be provided to change the wash water temperature, the washing intensity, number of the rinse cycles and the spin-dry intensity. The option change may be made by allowing the user to select one of the option vales and such four options may be referenced to as "basic option". That is because the basic wash course includes the wash cycle, the rinse cycle and the spin-dry cycle.

For example, a spin-dry intensity option may allow the user to select a strong, middle or weak level. Alternatively, the spin-dry intensity option may allow the user to select one of the intensities by differentiating the drum rotation RPM. The number of rinse cycles option may allow the user to select one of five stages from doing not rinse cycle to four times of rinse cycle.

Together with the basic options, a reservation option may be provided. The reservation option may mean an option for delaying the end point of the course. For example, when the user selects a specific course which takes two hours, the end time of the selected course is set after four hours from the current time. In this instance, the washing apparatus is configured to have a standby time for two hours and to perform the selected course for the other 2 hours and then end the wash course. Such the reservation option is quite useable when the user is out for a long time. In other words, the user is able to set to end the wash course at the time for coming home so that the time can be prevented when the user is waiting for the completion of the wash course or the washed laundry is neglected in the washing apparatus for a long time.

In the illustrated embodiment, the washing apparatus may include a single variable input unit 560 for providing an intuitive minimal user interface. A plurality of single variable input units 560 may be provided.

The single variable input unit 560 may allow the user to select one of input information data according to a selection point. In other words, one unit may be configured to perform more than two functions. The single variable input unit 560 may be provided for the user to select information, independent from the rotary knob 510. A button selectable by the user's touch may be provided as the single variable input unit 560.

More specifically, the single variable input unit 560 may have diverse input information data and selectively display the plural information data. It is preferred to visually display the meaning of the current selection on the single variable input unit 560.

As one example shown in FIG. 2, a clock-shaped icon 561 is displayed on the single variable input unit 560. The clock-shaped icon tells the user that the input information is related with the time, more specifically, reservation. Accordingly, the user is able to intuitively recognize the input information is related with reservation, when seeing the clock-shaped icon 561. In other words, it can be said that the single variable input unit functions as a reservation option input unit when the clock-shaped icon 561 is displayed.

The plurality of the single variable input units 560 may be provided. For example, single variable input units 560 may be provided for menu input 562, communication setting 563 and start/pause 521, respectively. As one example shown in FIG. 2, four single variable input units 560 are provided.

Figure 4:
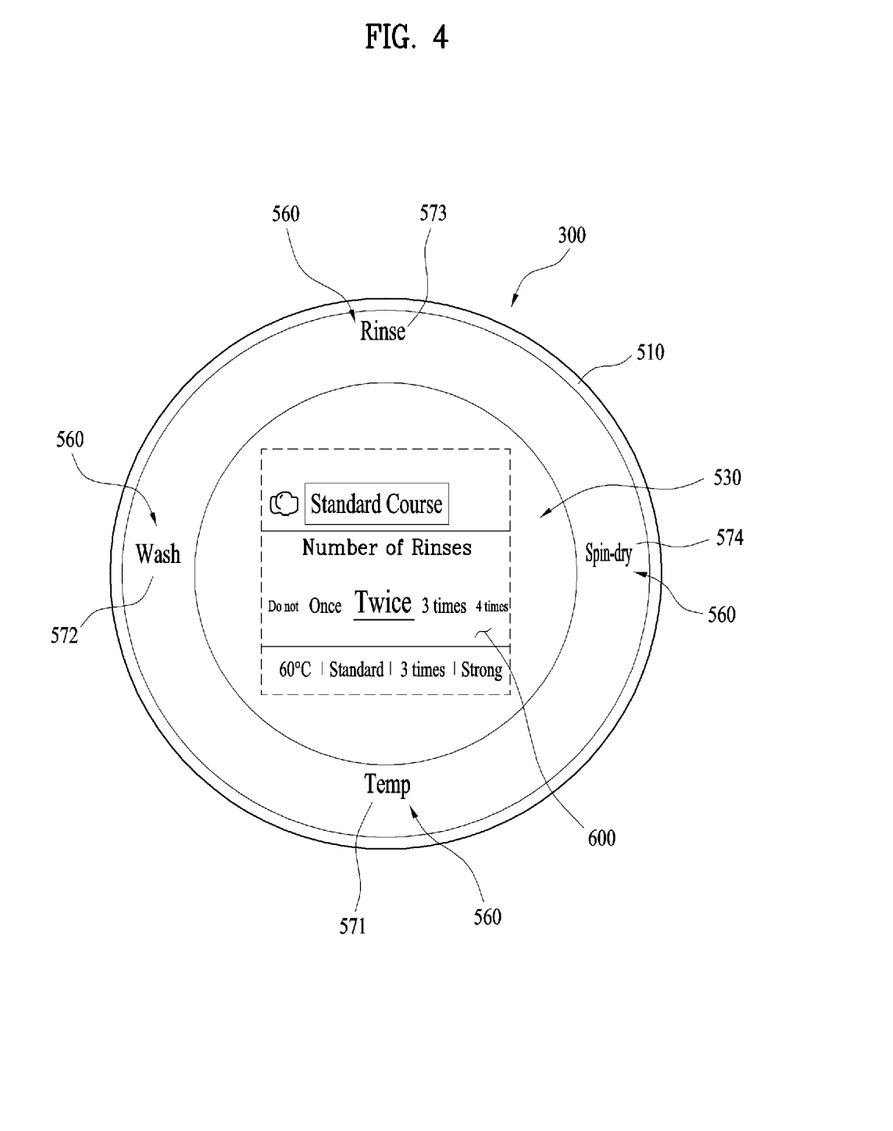
FIG. 4 is a front view illustrating one example that a rinse option screen is displayed in the user interface of FIG. 2.

Referring to FIGS. 2 and 4, the single variable input units 560 may be configured to selectively perform reservation setting and wash option setting. The single variable input units 560 may be configured to selectively perform menu setting and rinse option setting. The single variable input units 560 may be configured to selectively perform start/pause and spin-dry option setting. Also, the single variable input units 560 may be configured to selectively perform communication setting and wash water temperature setting.

More specifically, one single variable input unit may be configured to selectively perform two inputs. For example, when the course screen shown in FIG. 2 is displayed, the single variable input unit may be provided to perform the start/pause input 521. When an option screen for changing the basic option as shown in FIG. 4 is displayed, the single variable input unit 560 may be provided to perform spin-dry option change input 574.

The conversion of the input information on the single variable input unit 560 may be performed through a conversion input unit 600 (conversion input interface). When the conversion input unit 600 is input on the screen shown in FIG. 2, the screen shown in FIG. 2 is converted into the screen shown in FIG. 4. When the conversion input unit 600 is input on the screen shown in FIG. 4, the screen shown in FIG. 4 is converted into the screen shown in FIG. 2. At this time, not only the screen but also input information displayed on the single variable input unit 560 may be converted.

As mentioned above, options may include a basic option. In other words, a basic option in a specific wash course may be changed. To change such a basic option, option select units 571 through 574 may be provided. FIG. 4 shows four basic option select units and the number of the basic options may be variable.

In this instance, the option select units 571 through 574 may be realized through the single variable input unit 560. For example, one single variable input unit 560 may function as the clock-shaped icon 561 for changing reservation and a wash option select unit 572 for changing a wash option. The single variable input unit 560 may function as reservation select unit with displaying "clock-shaped icon 561" on the course screen and as wash option select unit with displaying "wash 572" on the option screen.

On the course screen shown in FIG. 2, the user is able to select the conversion input unit 600 to change a rinse option for example. The user's intention to change options corresponding to the selected course after selecting the course may be displayed as the input of the conversion input unit 600. At this time, the control unit controls the display to change the course screen into the option screen. In other words, the option screen shown in FIG. 4 is displayed.

In this instance, the plurality of the single variable input units 560 may be converted into the option select units for changing the basic option. The single variable input units may be converted into options select units for changing the wash water temperature, the washing intensity, the number of rinses and the spin-dry strength level, respectively. In other words, each of the single variable input units may display different information from the information displayed earlier.

When the user presses the variable input unit 560 displaying rinse 573 on the option screen shown in FIG. 4, the number of rinses may be varied and such contents may be displayed on the display 540. Together with the information about the selected course, the information about the changed option may be also displayed. As the user presses the corresponding single variable input unit to the wash 572, the wash water temperature 571 and the spin-dry intensity 574 as well as the rinse, such options may be varied.

More specifically, the user is able to select an option select unit 573 corresponding to the rinse option so as to change the rinse option. The selection of the rinse option select unit 573 may be performed by the user's press or touch of the option select unit 573. When the rinse option select unit 573 is selected, the display 540 may display an option screen for changing the rinse option. In other words, the control unit controls the display 540 to display a corresponding option screen to the rinse option select unit 573, when the rinse option select unit 573 is input. FIG. 4 shows one example of the option screen for changing the rinse option.

On the screen shown in FIG. 4, the user may select a desired rinse option, in other words, a different number of rinses from a preset number of rinses. For example, the basic setting of three times as number of rinses may be changed into two times.

The change of the number of rinses may be performed by the user's pressing of the rinse option select unit 573. Whenever the user presses the rinse option select unit 573, the number of rinses may be sequentially changed.

After changing the number of rinses, the user may select the conversion input unit 600 on the screen shown in FIG. 4. More specifically, the user is able to make input to the conversion input unit 600 to select the completion of other option selects as well as the selection of the preset number of times when the rinse cycle is performed.

FIG. 4 illustrates the option screen for changing the rinse option. It is preferred that the rinse option select unit 573 is displayed brighter than the other option select units 571, 572 and 574. It might be impossible to select options on the reservation setting screen shown in FIG. 2 and it is preferred that such the select units 571 through 574 are not displayed on the reservation setting screen.

As mentioned above, the wash course selection and the option selection may be performed via the rotary knob 510, the single variable input unit 560 and the conversion input unit 600. Without being dispersed when using the user interface, the user's hand or gaze may be concentrated on a specific region and it is convenient to use the user interface.

More specifically, the manipulation of the rotary knob and the screen displayed on the inner portion of the rotary knob is changed so that the user interface can be implemented quite easily. In addition, the option selection and change and the option setting may be performed in the inner display region of the rotary knob 510 and the single variable input unit so that the user interface can be implemented very easily.

Hereinafter, the reservation option select will be described in detail as one example of the single variable input unit 560.

For example, the user is able to select the single variable input unit 560 corresponding to reservation setting on the course screen displaying "Standard Wash" shown in FIG. 2. In other words, the user may select the single variable input unit 560 displaying the clock-shaped icon 561. That is to directly reflect the user's intention to delay the end point of the standard wash course after selecting "Standard Wash".

Figure 3:
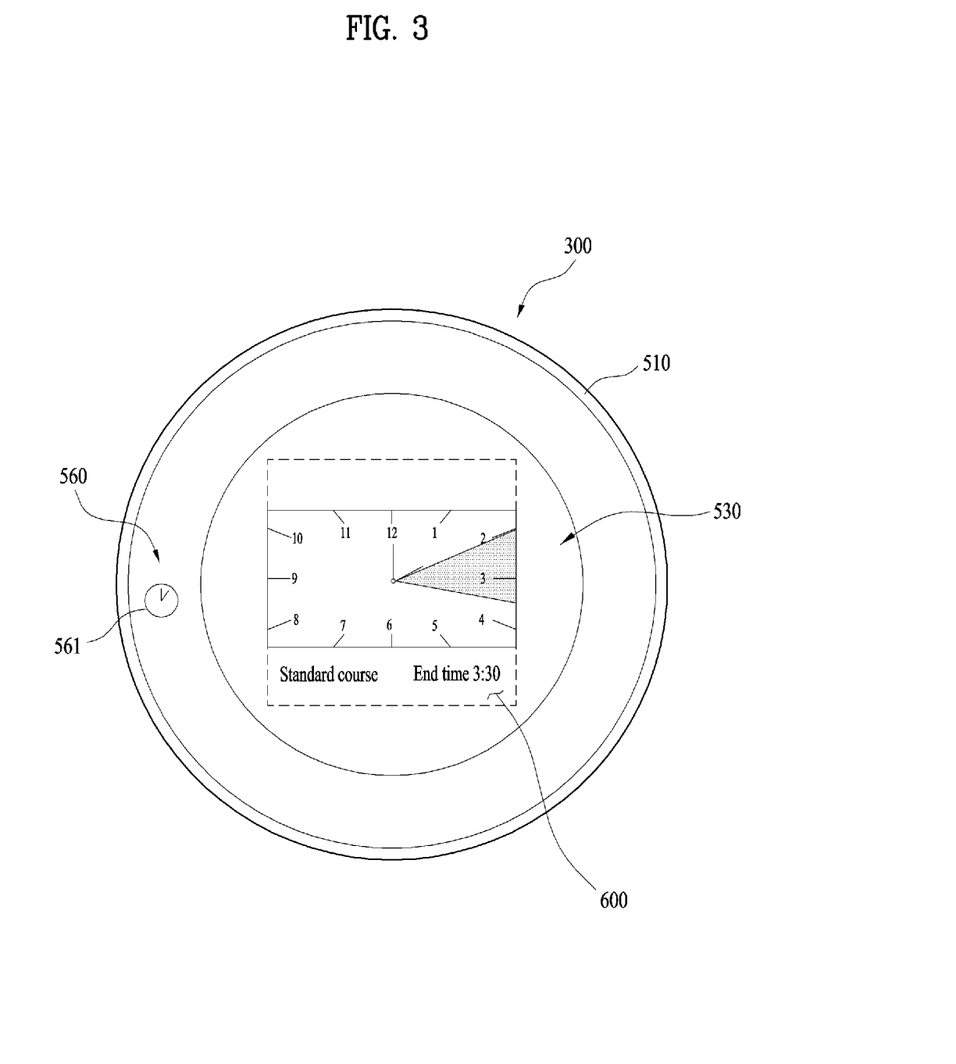
FIG. 3 is a front view illustrating one example that a reservation screen is displayed in the user interface of FIG. 2.

When the input unit 560 displaying the input information of "Reservation" is selected, the display 540 converts the currently displayed course screen shown in FIG. 2 into the reservation change screen shown in FIG. 3. In other words, the display 540 displays an option screen for changing reservation options. At this time, the single variable input unit 560 may be provided to start reservation and the display may be provided to selectively display a course screen and an option screen.

FIG. 3 illustrates one example of "Option Screen" for changing reservation options. In other words, when the single variable input unit 560 for displaying reservation information on the course screen is selected, the display may display an option screen for setting reservation as shown in FIG. 3, specifically, a reservation option screen for changing reservation time. At this time, the clock-shaped icon is displayed and the current time is displayed. A preset course name and an end time may be displayed. For example, when the duration time of the selected standard course is 1 hour 10 minutes, it may mean that the standard course is set to start after delay of 2 hours 20 minutes from the current time and that the standard course is performed for 1 hour 10 minutes to end in 3 hours 30 minutes from the current time.

Such reservation change or delay time change may be facilitated by the user's rotating the rotary knob 510. The rotary knob 510 may be used as means for changing the reservation time on an option screen, especially, an option screen for changing reservation, not the course screen. For example, as the user is rotating 1 pitch in the clockwise direction, the delay time may increase by 10 or 30 minutes. In the counter-clockwise direction, the delay time may decrease by 10 or 30 minutes. Of course, the range or unit of the delay time periods may be preset.

As shown in FIG. 3, only the clock-shaped icon 561 may be displayed on the single variable input unit 560. All the icons for the other single variable input units 560 may not be displayed, which indicates that input of the other single variable input units 560 is not possible on the reservation option screen. Of course, the clock-shaped icon 561 may be means for visually displaying that the current screen is the reservation option screen.

However, it may be possible to change reservation via the single variable input unit displaying the clock-shaped icon 561, not the rotary knob 510. In other words, as the single variable input unit 560 displaying the clock-shaped icon 561 is pressed, the reservation time may be variable according to preset time pitches. For example, whenever the clock-shaped icon 561 is pressed, the reservation time may increase by 30 minutes.

After determining the reservation time through the rotary knob 510 or the single variable input unit 560, the user may input his or her intention to show the reservation set completion through the conversion input unit 600. In other words, the input meaning completing the reservation setting may be made to the conversion input unit 600. At this time, the conversion input unit 600 may be provided to complete the reservation option setting as one example.

Once the conversion input unit 600 is selected to complete the reservation option setting, the display converts the option screen into the course screen again. The screen shown in FIG. 3 is converted into the screen shown in FIG. 2 and information related with the reservation setting may be displayed on the converted screen.

Accordingly, the single variable input unit 560 may be configured to start reservation. The conversion input unit 600 may be configured to selectively perform reservation setting completion after the reservation setting.

As circumstances require, some inputs or functions may be selected through one input unit 560 only to prevent the number of the input units from increasing. The point of the course selection is distinguished from the time point of the option selection after the course selection so as to induce the input the user needs. It is visually shown what the user's selection of the single variable input unit means according to the point of time, so that the user may not be confused. Such the input information is displayed on the single variable input unit 560, so that the user can figure out what it means to select the input unit 460 more intuitively.

Meanwhile, the distinguishing between the course select point and the option select point is equal to the distinguishing between the course screen displaying point and the option screen display point on the display as mentioned above.

For example, it is preferred that a time icon is displayed on the course screen and that "OK" is displayed on the option screen. The control unit may be implemented to change the input information displayed on the single variable input unit by distinguishing the screen displayed on the display.

More specifically, the control unit may control the input information corresponding to each course screen to be displayed on the single variable input unit. When the single variable input unit 560 is selected, the control unit may determine that the input information displayed on the single variable input unit is input. For example, when the single variable input unit 560 is input in a state where the reservation option start information is displayed, the control controls the display to display the option screen for changing the reservation option. When the single variable input unit 560 is input in a state where the setting completion information is displayed, the control unit controls the display to display the course screen. At this time, the course screen may be a course screen which reflects the changed option.

The selective display of several input information data may be realized by controlling one or more light sources. For example, the selective display may be realized by control of LED brightness, which will be described later.

Meanwhile, the single variable input unit 560 may be provided in the inner portion with respect to the radial direction of the rotary knob 510. In other words, the display region 530 may include the single variable input unit 560 as well as the display 540 so that the user can make intuitive inputs while minimizing movement of gave simultaneously.

Especially, the single variable input unit 560 may be formed in an annular shape with a black wall paper. Unless some information indicators (for example, the clock-shaped icon 561) are displayed, the single variable input unit 560 may look like a black display.

The single variable input unit 560 may have information indicators to have the same pitch along a circumferential direction.

A circular region located in the inner portion with respect to the radial direction of the rotary knob 510 is partitioned off into the display 540 and the single variable input unit 560. In case of using a rectangular display, the display region 530 may further include a dummy region. The single variable input unit 560, the dummy region and the display 540 may be sequentially located along the inner portion with respect to the radial direction of the rotary knob 510.

The display region 530 may have the same color wallpaper. For example, the display region 530 may have black wallpaper. In other words, the entire inner portion with respect to the radial direction of the rotary knob 510 may be realized like one black display. It is preferred that only some region of the inner portion may be the display substantially. Accordingly, such satisfaction and design may be realized as if the touch display were used, without a high-priced touch display.

The effects of such the black display may become remarkable by light transmitting units, because light will not transmit through the light transmission unit in a state where the power is not applied. All of the icons 561, 562, 563 and 564 shown in FIG. 2 and all of the icons 571, 572, 573 and 574 shown in FIG. 4 seem to disappear. In other words, light cannot transmit the light transmission unit corresponding to the single variable input unit 560 and the display 540 is also in an off state, so that the display region may look like black display. Accordingly, the minimal design with no characters and figures printed on the front surface of the control panel may be realized.

Meanwhile, the conversion input unit 600 may be the display region 530 or the display 540. In other words, the conversion input unit 600 may be realized by the user's touching or pressing of the display region 530 or the display 540.

When the user presses the display 540 on the screen shown in FIG. 2, the control unit may determine that there is input to the conversion input unit and converts the current screen into the screen shown in FIG. 4.

Next, referring to FIGS. 5 through 8, the structure of the user interface 300 mentioned above will be described in detail.

Figure 5:
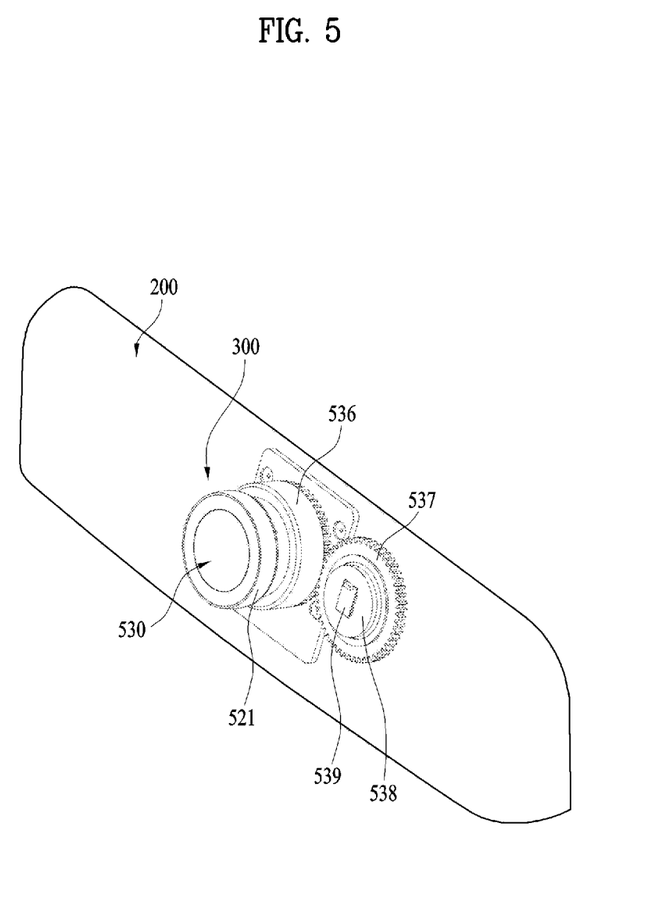
FIG. 5 is a perspective diagram illustrating a relation between a control panel and the user interface of FIG. 2.

FIG. 5 illustrates a location relation between the control panel 200 and the user interface 300. The rotary knob 510 is exposed to the front surface of the control panel 200 and the other components may be arranged in an internal space of the control panel 200. The display region 530 is exposed to the front surface of the control panel 200 to allow the user to have access thereto. It is preferred that the single variable input unit 560 arranged between the rotary knob 510 and the display region is also exposed to the front surface of the control panel 200. In other words, only the input means for facilitating the user's direct manipulation may be exposed to the front surface of the control panel 200.

The rotary knob 510 is rotatable and the display region 530 provided in the inner portion with respect to the radial direction of the rotary knob 510 is not rotatable.

The rotation of the rotary knob 510 is transmitted to a display mounting portion 536 and the rotation of the display mounting portion 536 is transmitted to an encoder mounting portion 537 again. An encoder 539 is rotated by the rotation of the encoder mounting portion 537. A rotation signal of the encoder 539 is transmitted to the control unit (not shown) and the control unit is realized by a controller mounted on PCB.

The display 540 may be loaded in an inner portion with respect to a radial direction of the display mounting portion 536. Even when the display mounting portion 536 is rotated, the display 540 may be fixed, not rotated. In other words, the rotary knob 510 and the display mounting portion 536 may be rotatable with respect to the display region 530. Accordingly, it is difficult to locate the encoder 539 in a rear portion of the rotary knob 510 and it is preferred that the encoder mounting portion 537 is located in an outer portion with respect to the radial direction of the display mounting portion 536 to transmit the rotation of the rotary knob 510 to the encoder 539.

The display mounting portion 536 and the encoder mounting portion 537 may be configured to engage with each other, only to transmit the rotation.

Figure 6:
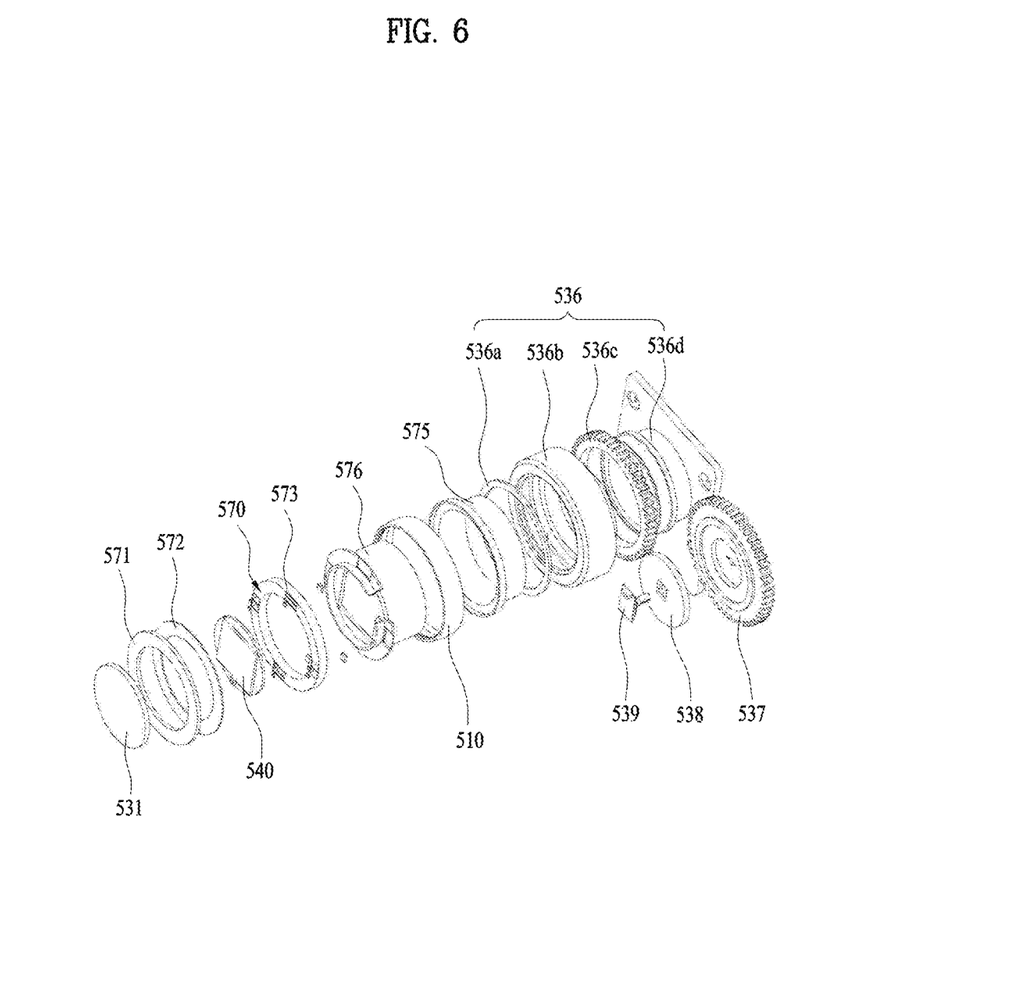
FIG. 6 is an exploded perspective diagram illustrating the user interface of FIG. 2.

FIG. 6 is an exploded perspective diagram of the user interface 300 shown in FIG. 5.

The rotary knob 510 is inserted in a rotary knob accommodating portion 575. It is preferred that the rotary knob 510 and the rotary knob accommodating portion 575 are integrally rotated with each other.

The rotary knob accommodating portion 575 is coupled to the display mounding portion 536. The rotary knob 510, the rotary knob accommodating portion 575 and the display mounting portion 536 may be integrally rotated with each other as one body.

More specifically, the display mounting portion 536 may include an annular sealing member 536a and a body 536b. The sealing member 536a is disposed between the rotary knob accommodating portion 575 and the body 536b. The display mounting portion 536 may include an annular gear 536c coupled to the body 536b and a bracket 536d.

The bracket 536d may be provided to fix the interface 300 in the control panel 200.

As the rotary knob 510 is rotated, the rotary knob accommodating portion 575 and the display mounting portion 536 are rotated together. Such rotation may be transmitted to the encoder mounting portion 537. The encoder 539 may be mounted to the encoder mounting portion 537 via the encoder accommodating portion 538.

The encoder mounting portion 537 may be formed to gear-engage with the display mounting portion 536, so that it may be possible to transmit the rotation of the rotary knob 510 to the encoder 539 located in the outer portion with respect to the radial direction of the rotary knob 510.

Meanwhile, the bracket 536d is configured not to rotate so that the other components of the display mounting portion 536 may be rotatably coupled to the bracket 536d. The display 540 may be mounted in a central portion of the bracket.

Regardless of the rotation of the rotary knob 510, it is preferred that the display 540 and the single variable input unit 560 is not rotatable.

A LED supporter housing 576 may be provided in the inner portion with respect to the radial direction of the rotary knob 510. The LED supporter housing 576 may be extended to the bracket 536d so that it may not rotate. A LED supporter 570 is provided in the LED supporter housing 576. The LED supporter 570 is coupled to the LED supporter housing 576 and also not rotatable.

The LED supporter 570 may be formed in an annular shape. The display 540 may be located in the inner portion with respect to the radial direction of the LED supporter 570.

An annular plate 572 may be provided in front of the LED supporter 570. The display 540 may be located in the inner portion with respect to the radial direction of the LED supporter 570.

The annular plate 572 may be provided in front of the LED supporter 570. A touch portion 571 may be provided in front of the annular plate 572 and the touch portion 571 may be formed in an annular shape. Such the touch portion 571 may be directly touched by the user and a window 531 may be provided in an inner portion with respect to a radial direction of the touch portion 571. The window 531 is provided in front of the display and protects the display 540.

Meanwhile, the touch portion 571 may be provided to select the plurality of the single variable input units 560 as one unit. The LED supporter 570 corresponding to the touch portion 571 may be also provided as one unit.

Figure 7:
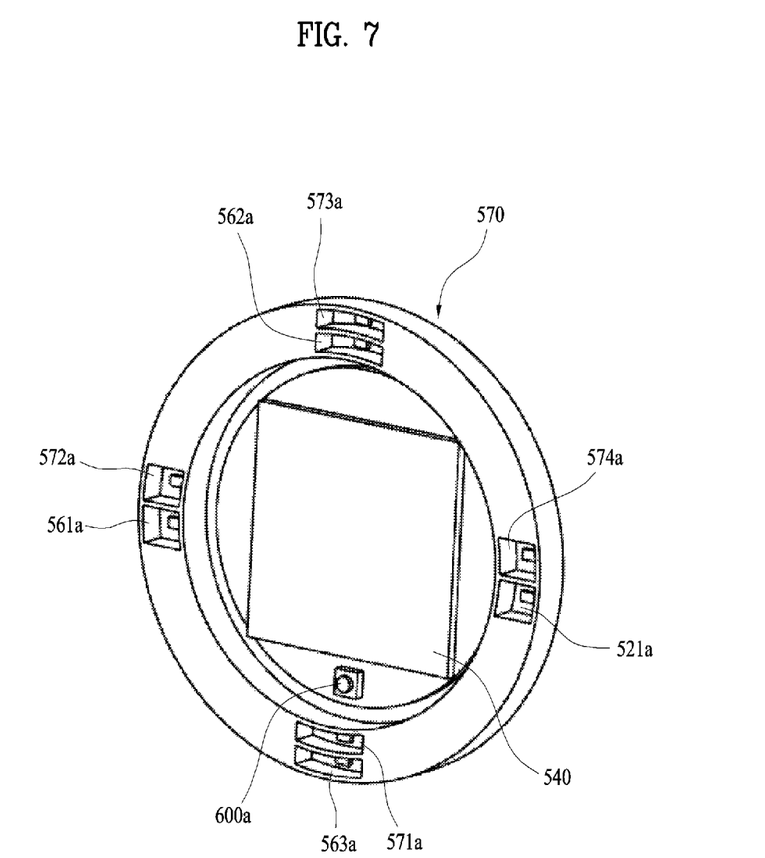
FIG. 7 is a front perspective diagram illustrating a display and a LED supporter which are shown in FIG. 6.
Figure 8:
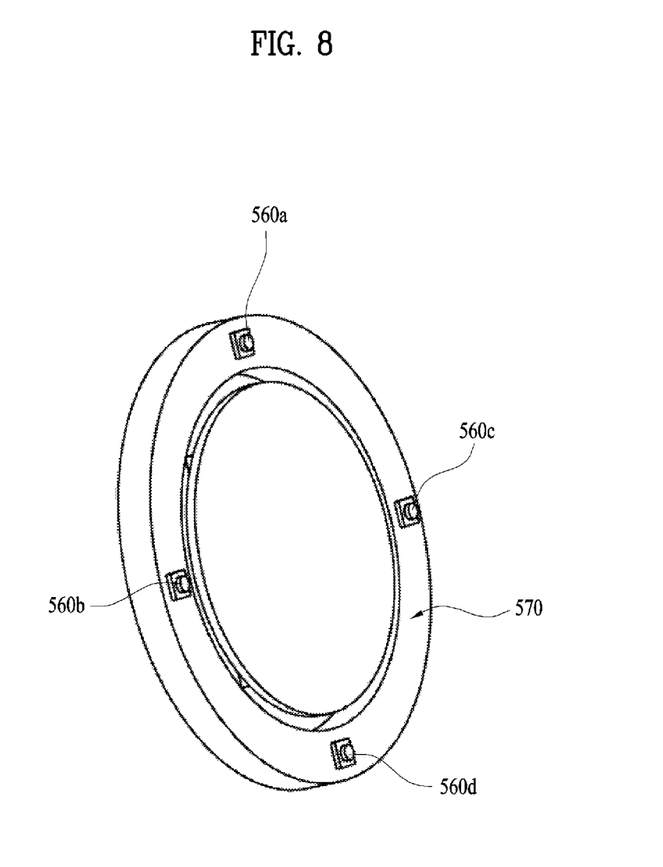
FIG. 8 is a rear perspective diagram illustrating the display and LED supporter which are shown in FIG. 6.

Referring to FIGS. 7 and 8, the LED supporter 570 will be described in detail.

The LED supporter 570 may be configured to form the single variable input unit 560. LEDs are located in four regions of upper, lower, right and left regions of the front surface, respectively.

Left LEDs 572a and 561a may be provided to display two information sources. Also, right LEDs 574a and 521a, upper LEDs 573a and 562a and lower LEDs 563a and 571a may be provided to display two information sources, respectively.

In other words, only one of the two LEDs is controlled to emit light and allow the user to select the luminescent information indicator. For example, when the LED 572a emits light and the LED 561a emits no light, the wash option may be selected. In the opposite case, the reservation option may be selected.

Switches 560a, 560b, 560c and 560d may be provided in a rear surface of the LED supporter 570. When a specific single variable input unit is selected, only a corresponding switch may be pressed and such switches may be a tact switch.

When the user presses a region near the LED 562a shown in FIG. 7, a switch 560a located behind the LED is pressed. Such switches may be located in four upper, lower, right and left corresponding portions of the rear surface of the LED supporter 570.

Meanwhile, an auxiliary switch 600a may be provided behind the window 531. The auxiliary switch 600a may be also a tact switch. When the user presses the window 531, the switch 600a is pressed. The switch 600a may be independently provided from the display 540 and located under the display 540.

Accordingly, the conversion input unit 600 (conversion input interface) may be realized by the window 531 and the switch 600a. In other words, the conversion input unit 600 may include the switch 600a provided behind the window.

Especially, the illustrated example selectively shows which inputs are made to one input unit. Accordingly, the decrease of the input units, usability and the user's confusion may be effectively prevented.

INDUSTRIAL APPLICABILITY

Industrial applicability of the present invention is included in the description of the specific embodiments mentioned above.

What is claimed is:
1. A washing apparatus providing a plurality of wash courses, and provided to change one or more options of a specific wash course on assumption that the specific wash course is selected from the wash courses, the washing apparatus comprising:
a rotary knob configured to select the specific wash course;
a display region provided in an inner portion with respect to a radial direction of the rotary knob and configured to selectively display a course screen for the specific wash course selected through the rotary knob and an option screen for changing the one or more options;

a variable input interface provided between the rotary knob and the display region, configured to be additionally selected by the user, independent from the rotary knob and configured to display and select a plurality of input information;

a conversion input interface provided in an inner portion with respect to the radial direction of the variable input interface and configured to allow the course screen to be displayed therethrough and selected by the user in the display region according to the rotary knob and the variable input interface and to display the option screen corresponding to the course screen in the display region when the user selects the course screen; and a controller configured to display the course screen in the display region according to rotation of the rotary knob, display the option screen of the course screen according to selection of the course screen of the conversion input interface and display, in the display region, selected input information according to selection of one of the plurality of input information of the variable input interface, wherein the conversion input interface is configured to change the input information displayed on the variable input interface according to the user's selection, and complete setting of the course screen or the option screen displayed in the display region.

2. The washing apparatus according to claim 1, wherein the controller determines that the input information displayed on the variable input interface is the input information, when the variable input interface is selected.

3. The washing apparatus according to claim 2, wherein the variable input interface comprises:

a plurality of light transmission units corresponding to the plurality of input information;

a plurality of light sources corresponding to the plurality of the light transmission units, respectively;

a single touch portion; and a single switch corresponding to the single touch portion.

4. The washing apparatus according to claim 3, wherein the controller selectively controls brightness of the light sources for the user to recognize specific data of the plurality of input information displayed on the variable input interface.

5. The washing apparatus according to claim 4, wherein the controller controls the brightness of the light sources to be at least two levels including a maximum and a minimum or at least three levels including the maximum, a middle and the minimum.

6. The washing apparatus according to claim 1, wherein the variable input interface is provided as one or more variable input interfaces and the one or more variable input interfaces are radially provided in an inner portion of the rotary knob to be distinguished from each other.

7. The washing apparatus according to claim 6, wherein the plurality of input information of the variable input interface include at least one of wash water temperature, washing intensity, number of rinses and spin-dry intensity in the specific wash course and at least one of reservation setting, communication setting, menu setting and pause/stop.

8. The washing apparatus according to claim 7, wherein at least four variable input interfaces are provided to correspond to the wash water temperature, the washing intensity, the number of rinses and the spin-dry intensity, respectively.

9. The washing apparatus according to claim 1, wherein the conversion input interface comprises a switch operable by the user's press or touch of the display region.

* * * * *